Sept. 17, 1940.  C. E. KRAUS  2,215,007
METAL TURNING
Filed Dec. 17, 1938   3 Sheets-Sheet 1
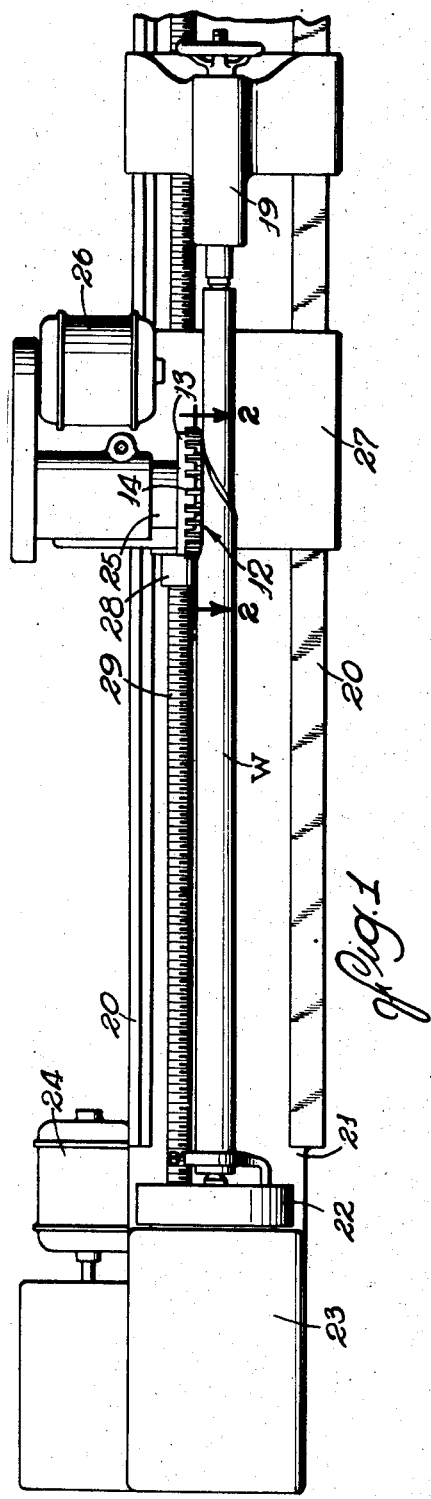
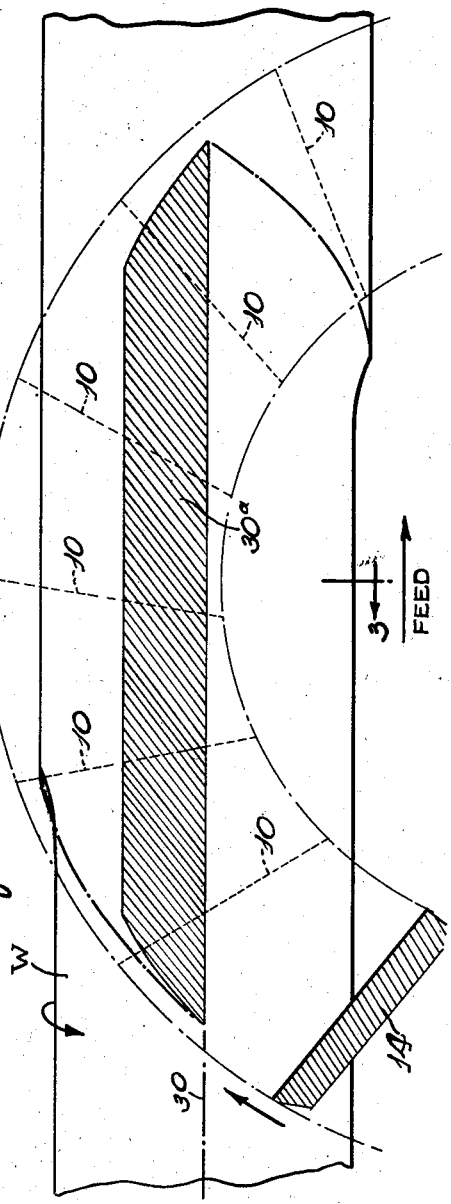
INVENTOR
Charles E. Kraus
By Parker, Carlson, Pitzner & Hubbard
ATTORNEYS Sept. 17, 1940.   C. E. KRAUS   2,215,007
METAL TURNING
Filed Dec. 17, 1938   3 Sheets-Sheet 2
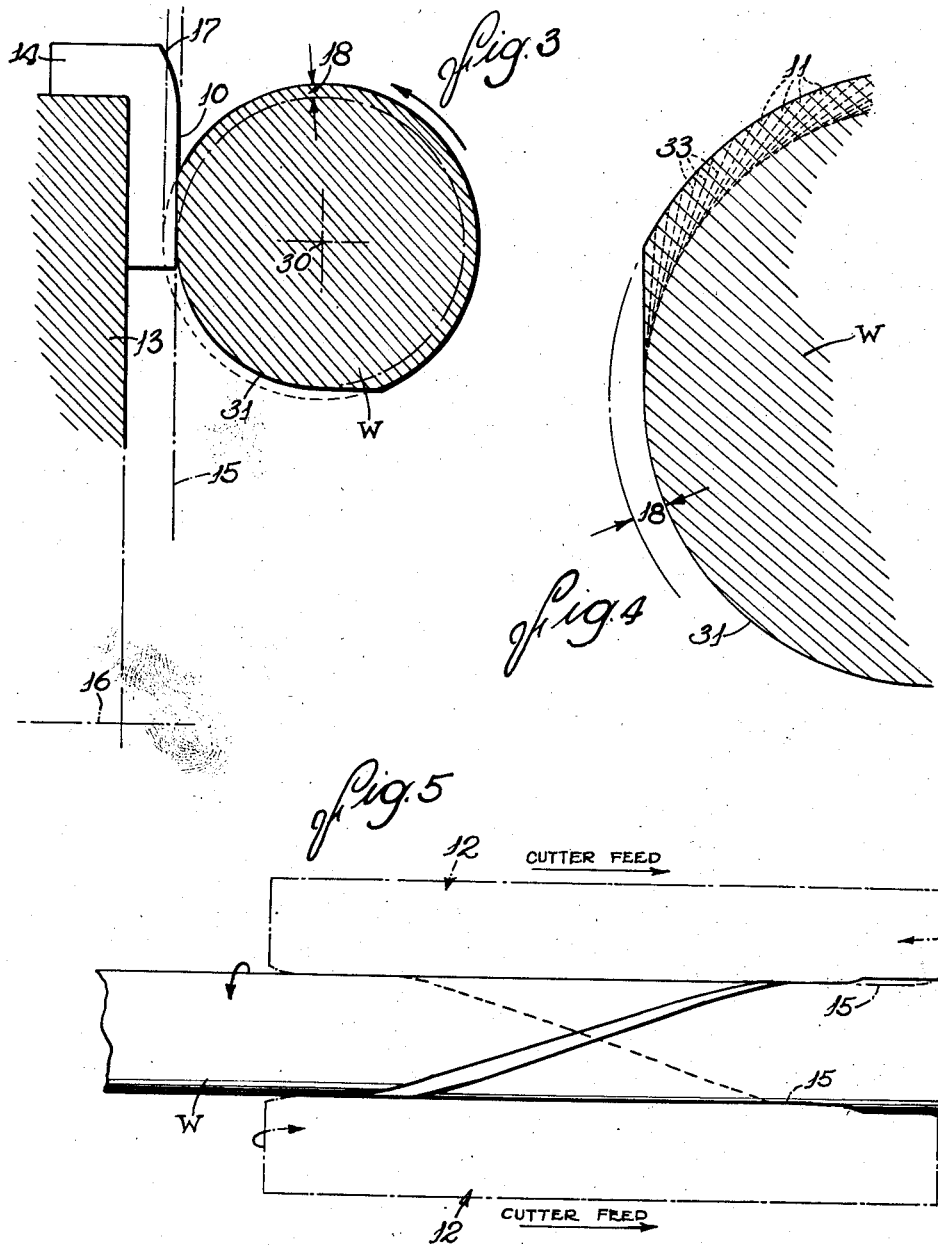
INVENTOR
Charles E. Kraus
By Parker, Carlson, Pitzner Hubbard
ATTORNEYS

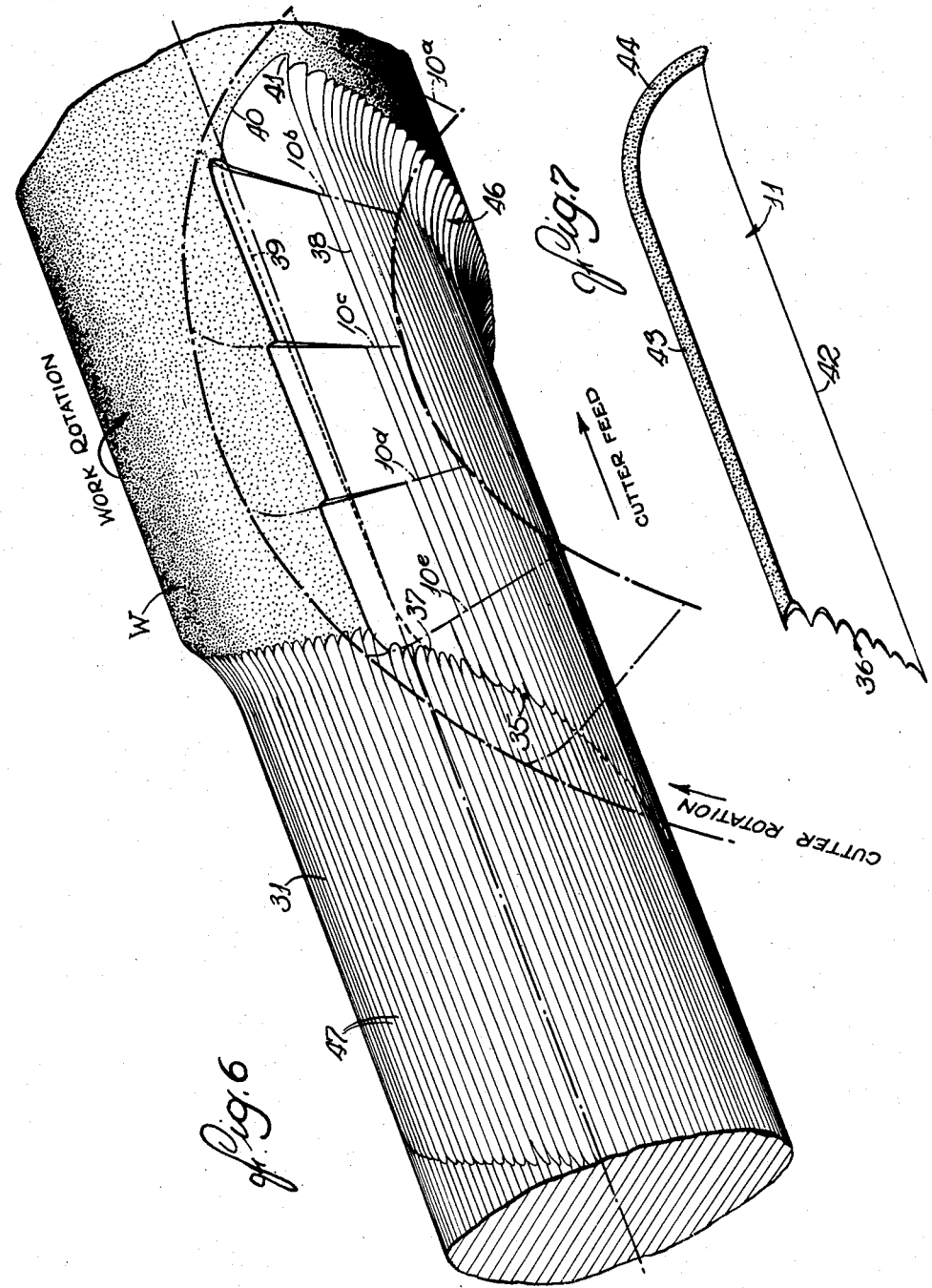

Patented Sept. 17, 1940

2,215,007

UNITED STATES PATENT OFFICE 2,215,007

METAL TURNING

Charles E. Kraus, Rockford, Ill., assignor to The Ingersoll Milling Machine Company, Rockford, Ill., a corporation of Illinois Application December 17, 1938, Serial No. 246,357

15 Claims. (Cl. 90—20)

This invention relates to the turning of metal work pieces through the use of a series of cutting edges revolving about a common axis.

The general object is to provide a novel method and apparatus of the above character by which work pieces may be turned at an increased rate as compared to prior turning practice.

The invention also resides in the novel manner in which the cutting edges and work are moved relative to each other to obtain chips of optimum length for a cutter of given size.

Other objects and advantages of the invention will become apparent from the following detailed description taken in connection with the accompanying drawings, in which—

Figure 1 is a plan view of a turning machine by which the present invention may be practiced.

Fig. 2 is an enlarged fragmentary sectional view taken generally along the line 2—2 of Fig. 1.

Fig. 3 is a section taken along the line 3—3 of Fig. 2.

Fig. 4 is a fragmentary end view of a work piece illustrating the lines along which the metal is cut therefrom.

Fig. 5 is a fragmentary plan view of a modified form of cutter arrangement.

Fig. 6 is a fragmentary view of a partially machined work piece.

Fig. 7 is a perspective view of one of the chips.

While the invention is susceptible of various modifications and alternative uses and is capable of being practiced in a variety of machines, I have illustrated in the drawings and will herein describe the preferred embodiments of the invention and typical machines and ways for practicing the same. I do not intend, however, to limit the invention by such exemplary disclosure but aim to cover all modifications and alternative methods and constructions falling within the spirit and scope of the invention as expressed in the appended claims.

Generally stated, the improved method comprises revolving a series of angularly spaced cutting edges 10 defining an annular or ring-shaped end cutting face, supporting a work piece W to be turned with its periphery intersecting the plane of the cutting face along a chord thereof offset outwardly from the axis of the face beyond the inner periphery thereof, and relatively rotating the work piece and the revolving edges about the longitudinal axis of the work preferably in a direction to advance points on the work inwardly across the path of the revolving edges so as to cause removal of metal in chips or slices 11 of a length along said chord substantially greater than the radial width of the cutting face. In most instances, the improved method also involves relatively feeding the revolving edges and the work longitudinally of the work through a distance for each revolution of relative rotation between the two substantially greater than the radial width of the cutting face and preferably approaching the length of the chord of intersection between the work and the cutting face. During such feeding movement, a band of metal extending helically around the work is removed in a succession of slices of substantial length longitudinally of the work and having a maximum thickness which is not influenced appreciably by the rate of feed. Accordingly, a high rate of feed may be employed and the work piece turned at a rapid rate without overburdening the cutting material.

The tool indicated at 12 for carrying out the improved method comprises a body 13 having a plurality of elongated blades 14 suitably fastened therein and extending generally radially of the end face of the body with one side of the blade projecting therefrom. The cutting edges 10, which are formed on the projecting sides of the blades, are straight through the major portion of their lengths and are disposed in a common plane 15 so as to define an end or axially facing cutting face perpendicular to the rotational axis 16 of the cutter. For a purpose to appear later, the outer end portions 17 of the edges 11 are preferably curved away from the cutting face defining a coned outer peripheral cutting face which is of narrower radial width than the main face and of an axial height somewhat greater than the thickness of the metal layer 18 to be removed from the work.

While being operated upon by the cutter, the work W may be mounted in an ordinary lathe type of machine tool being supported at one end by a tailstock 19 adjustable along ways 20 of a bed 21. The other end is supported by a drive plate 22 on a headstock 23 driven by an electric motor 24 through appropriate speed change and clutch mechanisms (not shown) to enable the speed of rotation of the work to be varied as desired.

The cutter 12 is fast on the end of a spindle 25 driven in the usual way by an electric motor 26 and supported on a carriage 27 which is slidable along the ways 20. On the carriage is the usual split nut 28 encircling a lead screw 29 and arranged to be engaged and disengaged under manual control. The lead screw is rotatably supported on the bed 21 and, to correlate its speed with that of the work, may be driven by the motor 24 through appropriate speed change and clutch mechanisms arranged for selective operation to control the rate of feed of the carriage along the work when the feed drive is operative.

While operating on the work, the cutter is positioned as shown in Figs. 2 and 3 with its axis 16 extending perpendicular of the work axis 30 but offset laterally therefrom a distance slightly greater than the radius of the circle described by the inner ends of the blade edges. The axial position of the cutter during turning of a work piece is such that the plane of the flat edges 10 is disposed parallel to the work axis and intersects the periphery of the work to the depth to which the work piece is to be turned. Preferably, the degree of offset of the cutter and work axes is such that the inner peripheral portion of the cutting face is tangent to the finished surface 32 of the work piece, the outer portion of the flat face and the conical face overhanging this surface as shown in Fig. 3. With the parts thus positioned, the zone 30ª of intersection, indicated by the shaded area in Fig. 2, extends along substantially the full length of a chord of the annular cutting face spaced outwardly beyond the inner periphery thereof. In traversing this zone, each cutting edge, although describing a circular arc, moves generally longitudinally of the work piece.

To utilize a cutter of given size to best advantage in effecting rapid removal of metal in slices having lengths approaching that of the chord of engagement, the direction of relative rotation between the work and the cutter and about the work axis is such that a point on the work moves inwardly across the active side of the cutting face and toward the cutter axis. As viewed in Fig. 3, this direction is counter-clockwise. By virtue of such relative rotation during rotation of the cutter, the successive cutting edges 10 will pass through the periphery of the work along cutting lines 33 (Fig. 4) thereby removing chips or slices 11 of metal which in cross-section taper inwardly to tangency with the machined work surface 31 which is finished by the inner end portions of the blade edges 10.

To turn work pieces of substantial length, the rotating work and cutter are fed relative to each other parallel to the work axis and at a continuous rate such that the chips 11 may be elongated up to the length of the chord of engagement between the work and cutting face thereby effecting removal of metal at an extremely rapid rate. The rate of feed, which is obtained by adjusting the speed of the lead screw 29 relative to that of the work piece is such that during each revolution of the work, the cutter is fed a distance greater than the radial width of the cutting face so as to produce chips of equal length. Removal of metal at a maximum rate is obtained when the rate of feed per revolution of the work is such that the chip length approaches that of the chord of intersection shown in Fig. 2.

The cutting action may best be explained by reference to Fig. 6 which shows a partially turned work piece. The cutting edges 10 are being revolved, the work rotated, and the cutter fed in the directions indicated by the arrows. The cutting edges separated and indicated at 10ᵇ, 10ᶜ, 10ᵈ, and 10ᵉ have passed partially through the work. The edge 10ª which has completed its cut entered the work at a point 35 on the finished surface 31, the initial engagement having occurred near the outer end of the straight portion of the edge. As this edge advanced into the work, the zone of engagement increased in length and progressed inwardly along the edge during formation of the jagged end portion 36 of the chip 11 (Fig. 7). Then, after emergence of the outer portion of the edge from the rough work surface at 37, the engagement between the edge and the work extended between generally parallel lines 38 and 39 which define opposite side edges of the chip. After the blade edge thus advancing generally longitudinally of the work passed over center, the zone of engagement with the work shifted outwardly along the edge 15 and finally along the curved outer end portion 17, the latter emerging from the rough work surface along a curved line 40 finally leaving the work at the point 41. The succeeding edges 10ᵇ to 10ᵉ entered the work at corresponding points on the finished surface and progressed through the work in the same manner.

The chips 11 thus formed taper transversely from a feather edge 42 on one side which merges with the finished surface to a thickened edge 43 at the side cut from the rough surface of the work. At the last formed end of the chip, the thickened side is curved as indicated at 44, this being formed by the portions 17 of the cutting edges. Since these portions slope gradually away from the plane of the flat part of the cutting face, interference between the ends of the blade and the work as well as objectionable thickening of the chip at the end finally formed is avoided. The curvature of the edge portions 17 may vary widely. Preferably, however, they are made as short as possible while at the same time avoiding excessive wear thereon due to thickening of the chip portion formed which increases in thickness as the length of the curved portions 17 is decreased.

By cutting the slices 11 in the manner described, it will be observed that a band of metal is removed from the periphery of the work piece extending helically therearound leaving the cylindrical finished surface 31 and a curved surface 46 connecting the finished and rough surfaces. Owing to the fact that the cutting edges move in a plane, narrow facets 47, which are exaggerated in Fig. 6, will be left on the finished work surface. The width of these will be determined by speeds of the cutter and work which may be regulated to give any desired smoothness to the finished surface.

It will be apparent that by locating the zone of engagement between the work and the cutting edges along an elongated chord of the annular face of the cutter, chips of substantial length may be cut from the work with a cutter of practical size and that the maximum thicknesses of the chips are not influenced appreciably by the rate of longitudinal feed of the cutter. As a result, a high rate of feed may be employed and metal may be removed from the work piece at a correspondingly rapid rate.

If it is desired to effect a still further increase in the permissible rate of feed, this may be accomplished by increasing the number of cutters so as to remove a series of helical bands from the work simultaneously. For example, two cutters may be disposed on opposite sides of the work piece as shown in Fig. 5 and arranged to operate on adjacent overlapping helical zones of the work thereby enabling the production capacity of the machine to be doubled. The use of two cutters is advantageous in that they may be located directly opposite each other as shown so that the force exerted on the work by one cutter and tending to deflect the work laterally will be counteracted and substantially balanced by that applied by the opposing cutter. Both of the cutters would, of course, be arranged to operate on the work in the manner previously described.

I claim as my invention:

1. The method of turning which comprises revolving a series of angularly spaced cutting edges having inner end portions disposed substantially in a common plane perpendicular to the axis of revolution of the edges and shorter outer end portions sloping away from said plane, supporting a work piece to be turned with its periphery intersecting said plane along a chord of the path traversed by said edges and disposed outwardly beyond the inner ends of the edges, relatively rotating said work piece and said revolving edges about the longitudinal axis of the work and in a direction to advance points on the work radially inwardly across said path, and simultaneously feeding said rotating edges and the work piece longitudinally of the latter and relative to each other at a distance per revolution of such relative rotation such as to cause removal of metal slices of a length along said chord substantially greater than the radius of the circle described by the inner ends of said edges.

2. The method of turning which comprises rotating an axially facing cutting face about an axis generally perpendicular to the face, supporting a work piece to be turned with its periphery intersecting said face along a chord thereof disposed outwardly from the inner periphery of the face, relatively rotating said work piece and said face about the longitudinal axis of the work and in a direction to advance points on the work from the outer to the inner periphery of said face, and during each revolution of such relative rotation, relatively feeding said face and the work piece longitudinally of said chord at a continuous rate and through a distance such as to remove metal slices each having a length along said chord greater than the radial width of said cutting face.

3. The method of turning which comprises revolving a series of angularly spaced cutting edges disposed substantially in a common plane perpendicular to the axis of revolution of the edges, supporting a work piece to be turned parallel to said plane with its periphery intersecting the path traversed by said edges along a chord of the path disposed in said plane outwardly beyond the inner ends of said edges, relatively rotating said work piece and said revolving edges about the longitudinal axis of the work, and simultaneously feeding said rotating edges and the work piece longitudinally of the latter and relative to each other a distance per revolution of such relative rotation approaching the length of said chord.

4. The method of turning which comprises rotating an annular planar cutting face about an axis perpendicular to the plane of the face, supporting a work piece to be turned with its periphery intersecting said plane along a chord of said face parallel to the longitudinal axis of the work and disposed outwardly from the inner periphery of said face, relatively rotating said work piece and said face about said longitudinal axis, and during each revolution of such relative rotation, relatively feeding said face and the work piece longitudinally of said chord at a continuous rate and through a distance greater than the radius of said cutting face.

5. The method of turning which comprises revolving a series of angularly spaced cutting edges in a common plane perpendicular to their axis of revolution, supporting a work piece to be turned with its periphery intersecting said plane along a chord of the path traversed by said edges disposed outwardly beyond the inner ends of the edges, and relatively rotating said work piece and said revolving edges about the longitudinal axis of the work and in a direction to advance points on the work inwardly across said path.

6. The method of turning which comprises revolving a series of angularly spaced cutting edges defining a ring-shaped end cutting face, supporting a work piece for cutting engagement with said face along a chordal zone of the latter disposed outwardly beyond the inner ends of said edges, relatively rotating said work piece and said revolving edges about the longitudinal axis of the work, and simultaneously effecting relatively bodily feeding movement between the rotating edges and the work piece parallel to the axis of the work piece.

7. The method of turning which comprises revolving a series of angularly spaced cutting edges having inner end portions disposed substantially in a common plane perpendicular to the axis of revolution of the edges and shorter outer end portions sloping away from said plane, supporting a work piece to be turned with its periphery intersecting said plane along a chord of the path traversed by said edges and disposed outwardly beyond the inner ends of the edges, relatively rotating said work piece and said revolving edges about the longitudinal axis of the work and in a direction to advance points on the work inwardly relative to said path, and simultaneously feeding said rotating edges and the work piece in a direction and at a rate such as to cause removal of metal from the work piece in slices of a length along said chord greater than the radius of the circle described by said inner ends.

8. The method of turning which comprises revolving a series of angularly spaced cutting edges defining a ring-shaped end cutting face, supporting a work piece to be turned with its periphery intersecting said face along a chord of said face spaced outwardly from the axis of said edges a distance greater than the internal radius of the face, relatively rotating said work piece and said revolving edges about the longitudinal axis of the work, and simultaneously effecting relatively bodily feeding movement between the rotating edges and the work piece to cause removal of metal in slices of a length along said chord greater than the internal radius of said path.

9. A turning machine having, in combination, a power rotated cutter having blades angularly spaced around its end and each having an inner end portion of substantial radial length defining a planar cutting face normal to the cutter axis and a shorter outer end portion sloping away from said plane, means supporting a work piece with the inner periphery of said cutting face tangent to the cylinder to which said work piece is to be turned along a chordal zone of said face extending along the work axis, mechanism for relatively rotating said work piece and cutter about the work axis to relatively advance the work surface across said cutting face toward the cutter axis, and power driven mechanism for feeding said work piece and cutter relative to each other along said work axis and through a distance per revolution of said relative rotation approaching the length of the chordal zone of intersection of the work and the path of the cutting edges.

10. A turning machine having, in combination, a power rotating cutter having a plurality of blades defining an annular end cutting face, means supporting a work piece with its periphery intersecting said cutting face along a chordal zone spaced outwardly from the internal circumference of the face, power driven mechanism for rotating said work piece and the rotating cutter relative to each other about the longitudinal axis of said work piece and in a direction to advance points on the work piece generally radially across a segment of said cutting face toward the axis thereof, and mechanism driven in timed relation to such relative rotation and operating to feed said cutter and the work piece relative to each other parallel to the work axis.

11. A turning machine having, in combination, a power rotating cutter having a plurality of blades angularly spaced around its end and defining an axially facing cutting face, means supporting a work piece with its periphery intersecting said cutting face along a chordal zone disposed outwardly from the internal periphery of the face, power driven mechanism for rotating said work piece and the rotating cutter relative to each other about the longitudinal axis of said work piece and in a direction to advance points on the work piece across a segment of said cutting face toward the axis thereof, and mechanism for effecting continuous relative feeding movement between said cutter and said work piece through a distance per revolution of relative rotation between the two greater than the internal radius of said cutting face.

12. A turning machine having, in combination, a power rotated cutter defining an end cutting face normal to the cutter axis, means supporting a work piece for engagement with said cutting face along a chordal zone of the latter spaced outwardly beyond the internal circumference of the face, mechanism for relatively rotating said work piece and cutter about the work axis to relatively advance the work surface across said cutting face, power driven mechanism for feeding said work piece and cutter relative to each other parallel to said work axis and through a distance per revolution of said relative rotation greater than the radial width of said cutting face.

13. A turning machine having, in combination, a power rotated cutter having blades defining a substantially planar end cutting face, means supporting a work piece with the inner periphery of said cutting face tangent to the final surface to be formed on said work piece along a chord of said face offset laterally from and extending along the axis of the work piece, mechanism for relatively rotating said work piece and cutter about the work axis to relatively advance the work surface across said cutting face, and power driven mechanism for feeding said work piece and cutter relative to each other at a rate such as to cause removal by each edge of a slice of metal having a length longitudinally of the work greater than the radius of said cutting face.

14. A turning machine having, in combination, a power rotating cutter having a plurality of blades angularly spaced around its end and defining an axially facing cutting face, means supporting a work piece with its periphery engaging said cutting face along a chordal zone disposed outwardly from the internal periphery of the face, and power driven mechanism for rotating said work piece and the rotating cutter relative to each other about the longitudinal axis of said work piece and in a direction to advance points on the work piece generally radially across a segment of said cutting face toward the axis thereof.

15. A turning machine having, in combination, a power rotated cutter having blades defining a planar cutting face substantially perpendicular to the cutter axis, means supporting a work piece with the inner periphery of said cutting face tangent to the cylinder to which said work piece is to be turned along a chord of said face spaced laterally from and extending lengthwise of the axis of said work piece, mechanism for relatively rotating said work piece and cutter about the work axis to relatively advance the work surface across said cutting face, and power driven mechanism for feeding said work piece and cutter relative to each other longitudinally of the work axis.

CHARLES E. KRAUS.